United States Patent Office 3,279,552
Patented Oct. 18, 1966

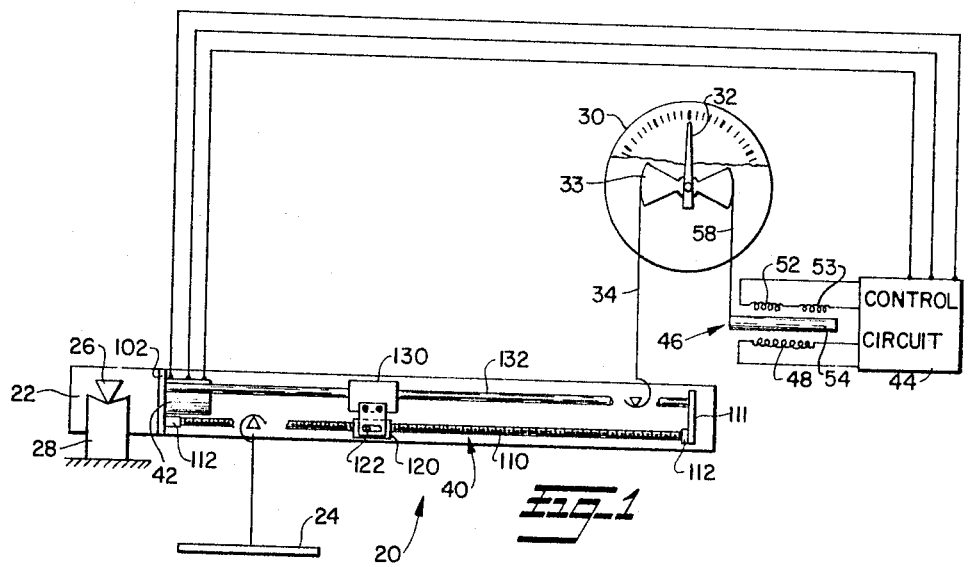
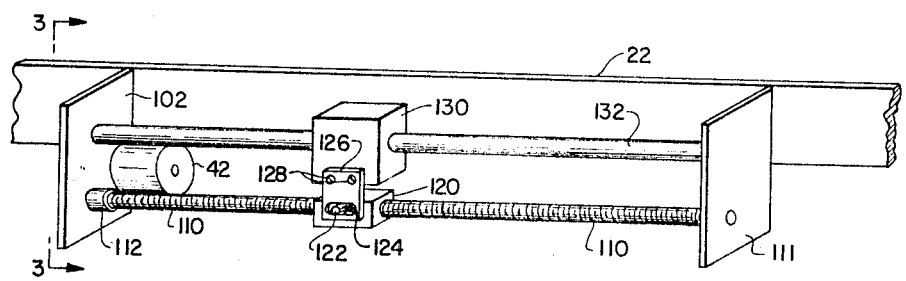
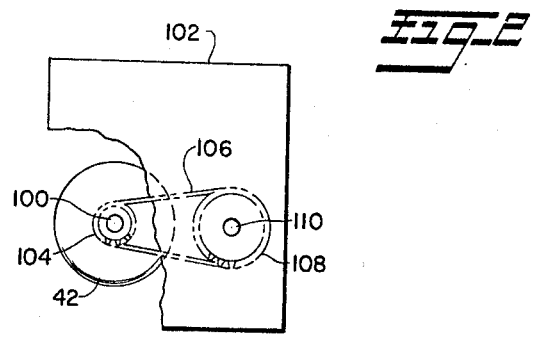
INVENTOR
PETER N. SOUTHALL
BY
Norris & Bateman
ATTORNEYS

3,279,552
AUTOMATIC TARE CONTROL SYSTEM FOR WEIGHING APPARATUS
Peter N. Southall, Whitehall, N.Y., assignor to Howe Richardson Scale Company, Clifton, N.J., a corporation of New Jersey
Filed Jan. 25, 1965, Ser. No. 427,632
8 Claims. (Cl. 177—213)

The present invention relates to weighing machines and is particularly concerned with automatic tare control systems having a motor driven, compensating poise assembly.

In conventional automatic tare mechanisms, a reversible motor is controlled by a dial indicator to drive a poise in opposite directions along a weighbeam for counterbalancing a load on the scale platform. Owing to the inertia of the poise and other moving parts in the system the compensating poise in conventional machines usually overshoots its point of static balance with the result that the poise will make repeated reversals in hunting for a static balancing position on the beam. One solution proposed in the past for overcoming this hunting condition has been to slow the poise down before reaching its static balancing position, but this is objectionable since it increases the time needed to balance the scale and therefore is not acceptable for weighing loads in rapid succession.

Accordingly, a major object of this invention is to provide a novel automatic compensating poise mechanism which substantially eliminates the condition where the poise makes repeated reversals in hunting for the static balancing position without reducing the poise driving speed. With the present invention, therefore, the time needed to balance a scale is reduced in comparison with prior automatic tare control systems which conventionally have a single beam-mounted poise.

More specifically, it is the object of this invention to provide a novel automatic tare control system having a specially constructed, reversible, motor-driven poise assembly in which the moving counterbalancing weight is reduced for a predetermined distance of travel when the drive for the poise assembly is reversed. As a result, the momentum of the poise assembly is lessened to correspondingly reduce the magnitude of overcorrection when a reversal is made in returning the poise assembly to its static balancing point.

Another more specific object of this invention is to provide a novel automatic tare mechanism having a light-weight, reversible motor-driven poise which is linked to a heavier poise by a lost motion connection that permits the light-weight poise to move a predetermined distance without displacing the heavier poise when the motor drive for the light-weight poise is reversed. The light-weight poise thus provides for a very fine adjustment while the heavier poise provides for rough adjustments and reduces the length of the tare beam needed to balance a given weight.

Further objects of the present invention will appear as the description proceeds in connection with the appended claims and annexed drawings wherein:

FIGURE 1 is a generally schematic view illustrating a weighing apparatus incorporating the automatic tare control system of this invention;

FIGURE 2 is an enlarged perspective view of the compensating poise mechanism shown in FIGURE 1; and FIGURE 3 is a section taken substantially along lines 3—3 of FIGURE 2.

Referring now to the drawings and more particularly to FIGURE 1, the reference numeral 20 generally designates a scale incorporating the present invention and comprising a rigid tare lever 22 which supports between its ends a platform 24 on which a load may be placed. A knife edge pivot 26 fixed to tare lever 22 seats on a fixed knife edge bearing 28 to provide a horizontal fulcrum axis for lever 22. The lever fulcrum axis is linearly spaced from the support point for platform 24.

With continued reference to FIGURE 1, a conventional dial head 30 is provided with a pointer 32 and a suitable pendulum assembly 33 which is connected by a cable 34 to suspend the free end of lever 22 in spaced relation to the lever fulcrum axis at 26, 28. Lever 22 and dial 30 together with pendulum assembly 33 constitute part of scale 20 and are of standard construction.

Still referring to FIGURE 1, a novel compensating poise assembly 40 constructed according to this invention is driven at a constant rate along lever 22 by a bi-directional or reversible electric motor 42 to counterbalance a load supported on platform 24. Motor 42 is energized by a control circuit 44 to which an operating signal is supplied by a differential transformer 46. Transformer 46 conventionally comprises a primary winding 48 and a plurality of secondary windings indicated at 52 and 53. A movable armature 54 for transformer 46 is connected to pendulum assembly 33 by a cable 58 or other suitable motion transmitting means.

When pointer 32 is at zero, armature 54 is in a null or zero position at which equal voltages are induced into secondary windings 52 and 53. Circuit 44 responds to the operating signal supplied by transformer 46 when armature 54 is at its null position to de-energize motor 42. When pointer 32 is moved in either direction from its zero setting, armature 54 is correspondingly displaced from its null position to increase the voltage in one of the secondary windings and to decrease the voltage in the other of the secondary windings of transformer 46. Under these conditions, circuit 44 responds to the operating signal applied by transformer 46 to drive motor 42 in one direction or the other. Circuit 44 is of any suitable and conventional null balance type for controlling the operation of motor 42 in the manner just described. Since these forms of control circuits are common and well known, further description thereof is not deemed necessary for a complete understanding of the present invention. Advantageously, circuit 44 may typically include a relay controller such as the model 6182–C1 manufactured by Automatic Timing and Control Corporation and disclosed in their Bulletin 6182 dated February 1961.

As best shown in FIGURE 3, motor 42 is provided with a drive shaft 100 and is mounted on a rigid bracket 102 which is fixed to tare lever 22. Fixed on shaft 100 is a sprocket wheel 104. An endless drive chain 106 is trained around sprocket wheel 104 and another sprocket wheel 108 which is fixed on a lead screw 110. Lead screw 110 extends between bracket 102 and a further bracket 111 which is also fixed to tare lever 22. Suitable bearings indicated at 112 journal lead screw 110 on brackets 102 and 111 in the manner shown. Preferably, brackets 102 and 11 are formed from flat sided plates that are contained in parallel, spaced apart planes that extend parallel to the fulcrum axis 24, 28 of lever 22.

As best shown in FIGURE 2, a light-weight compensating poise 120 is formed with a tapped through bore through which lead screw 110 threadedly extends. A cylindrical pin 122 is fixed to poise 120 at right angles to the rotational axis of lead screw 110 and freely extends through a slot 124 formed in a flat sided plate 126. Plate 126 is fixed by suitable cap screws 128 to a heavier compensating poise 130 which is slidably mounted on a smooth cylindrical rod 132. Rod 132 is fixed at opposite ends on brackets 102 and 111 in spaced parallel relation to lead screw 110. The longitudinal axis of slot 124 is parallel to the rotational axis of lead screw 110 and at right angles to the axis of pin 122. Plate 126 is preferably mounted in a plane that is parallel to the axes of rod 132 and lead screw 110. From the description, it is clear that the assembly of brackets 102 and 111, rod 132, lead screw 110, motor 42, and poises 120 and 130 are supported on lever 22.

In accordance with this invention, the weight of poise 130 is appreciably greater than the weight of poise 120, and poise 120 is linked to poise 130 only through the engagement of pin 122 with opposed edges of slot 124. Pin 122 cooperating with slot 124 in plate 126 thus provides for a lost motion or free-play connection between poises 120 and 130.

By turning lead screw 110 in one direction, poise 120 is linearly advanced to the left as viewed from FIGURE 2. When pin 122 engages with the left-hand edge of slot 124, poise 130 will be advanced as a unit with poise 120. When the direction of rotation of lead screw 110 is now reversed to advance poise 120 in the opposite direction, pin 122 moves freely along slot 124 towards its right-hand edge. Until pin 122 engages the right-hand edge of slot 122, however, the displacement of poise 122 will not be imparted to poise 130 with the result that poise 130 remains stationary during the interval that pin 122 is moved by poise 120 from the left-hand edge to the right-hand edge of slot 124. When pin 122 engages the right-hand edge of slot 124, the motion of poise 120 is imparted to poise 130 so that poises 120 and 130 then advance as a unit. Reversal of the direction of rotation of lead screw 110 to advance poise 120 in the opposite direction again results in limited movement of poise 120 before the displacement of poise 120 is imparted to advance poise 130. The amount of limited displacement in which poise 120 is movable without displacing poise 130 is determined by the length of slot 124. Reversal of the direction in which lead screw 110, in turn, is accomplished by reversing the direction of motor 42 in the manner previously explained.

In operation of the tare control system just described, a load to be counterbalanced is placed in platform 24 to move pointer 32 from its zero setting and thereby displace armature 54 in a predetermined direction from its null position. As a result, the signal applied by transformer 46 activates control circuit 44 to drive motor 42 in a direction for advancing poise 120 in a direction that is away from the fulcrum axis 26, 28 of tare lever 22.

By advancing poise 120, displacement of poise 130 is effected through the engagement of pin 122 in slot 124. At this stage, both poises 120 and 130 thus advance toward a static balancing position to move pointer 32 back towards zero and also to move armature 54 back towards its null position through the motion transmitting connection provided by pendulum assembly 33. Owing to the momentum of poises 120 and 130, poises 120 and 130 will slightly overshoot the static balancing position on lever 22 with the result that pointer 32 will move past zero and armature 54 will move in the opposite direction past its null position.

The displacement of armature 54 past its null position reverses the direction of motor 42. As a result, the direction of rotation of lead screw 110 is reversed to drive poise 120 back towards the fulcrum axis 26, 28 and towards the static balancing position on lever 22. As poise 120 is driven in the opposite direction, poise 130 will remain stationary for the interval that pin 122 moves from the right-hand end 124 to the left-hand end of slot 124. The length of slot 124 is sufficiently long to enable return movement of poise 120 to balance the scale without displacing poise 130. As a result, poise 120 will overshoot its balancing position only once to eliminate the repeated reversals encountered in prior weighing machines.

By returning poise 120 to its static balancing position, armature 54 is moved back toward its null position and pointer 32 is moved to its zero setting on the dial. Owing to the small weight of poise 120 in comparison with poise 130, the momentum imparted to poise 120 in returning it to its static balancing position is not great enough to cause it to overshoot in the reverse direction. Thus, the return movement of poise 120 to the static balancing position without displacing poise 130, returns armature 54 to its null position and moves pointer back to zero. By moving armature 56 to its null position, motor 42 is de-energized to complete the counterbalancing operation.

A common use of the automatic tare control system described herein is to obtain a direct dial reading of contents in a container. To accomplish this, the empty container is placed on platform 24 and is counterbalanced by moving poises 120 and 130 to their static balancing positions on lever 22. Thus pointer 32 will be moved to zero with the empty container on the scale. Motor 42 then is de-energized to prevent further displacement of poises 120 and 130, and the container is filled. Pointer 32 then will be moved to provide a direct dial reading of only the weight of the contents.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a weighing apparatus having a fulcrumed weigh beam, a compensating poise assembly mounted for movement on said beam, means for driving said poise assembly in opposite directions along said beam to counterbalance a load applied thereto and means for reducing the moving counterbalancing weight of said poise assembly for a predetermined distance of poise travel upon reversal of the direction in which said poise assembly is driven.

2. In a weighing apparatus having a tare lever fulcrumed about an axis for swinging movement in a vertical plane, means for supporting a load from said lever at a distance spaced longitudinally from the fulcrum axis of said lever, a compensating poise assembly mounted for longitudinal movement on said lever, means for driving said poise assembly in opposite directions along said lever to counterbalance a load applied thereto, and means for reducing the moving counterbalancing weight of said poise assembly for a predetermined distance of poise travel upon reversal of the direction in which said poise assembly is driven.

3. In a weighing apparatus having a fulcrumed weigh beam, a first compensating poise mounted for movement on said beam, means including reversible motor means responsive to movement of said beam about its fulcrum axis for advancing said poise in either direction to a static balancing position on said beam, a second compensating poise movably mounted on said beam, and a lost motion connection coupling said first poise to said second poise and providing for limited advancement of said first poise relative to said second poise.

4. The weighing apparatus defined in claim 3 wherein said lost motion connection comprises a pin and slot connection providing limited relative displacement of said poises along said beam.

5. The weighing apparatus defined in claim 3 wherein said first poise is appreciably lighter than said second poise.

6. A weighing apparatus having a fulcrumed weigh beam, a first compensating poise mounted for movement on said beam, means including reversible motor means responsive to movement of said beam about its fulcrum axis for advancing said poise in either direction to a static balancing position on said beam, a second compensating poise mounted for movement along said beam, a pin on one of said poises and means providing a slot receiving said pin on the other of said poises, said pin and slot cooperating to couple said second poise for movement with said first poise, but permitting limited displacement of said first poise relative to said second poise.

7. In a weighing apparatus, a tare lever mounted for pivotal movement about a substantially horizontal fulcrum axis, means for supporting a load from said lever at a distance spaced longitudinally from said axis, means including a dial indictor for supporting said lever at a distance spaced from said fulcrum axis, a lead screw mounted on said lever for rotation about an axis that is substantially normal to said fulcrum axis, a first poise threadly mounted on said lead screw, a reversible motor connected to rotate said lead screw in opposite directions for driving said poise in opposite directions along said lead screw, means responsive to the movement of said indicator by a lever-displacing load for controlling said motor to drive said poise to a position for counterbalancing said load, a support member fixed on said beam in parallel relation to said lead screw, a second compensating poise slidably mounted on said support member, and a motion transmitting, lost motion connection linking said first and second poises for axially advancing said second poise with said first poise, but providing for limited axial displacement of said first poise relative to said second poise.

8. The weighing apparatus defined in claim 7 wherein said lost motion connection comprises means rigid with one of said poises and providing a slot having a longitudinal axis extending parallel to the axes of said lead screw and said support member, and a pin element rigid with the other of said poises and extending into said slot along an axis at right angles to the axis of said lead screw, said pin being engageable with either end of said slot by axial advancemnt of said first poise to impart movement to said second poise.

References Cited by the Examiner
UNITED STATES PATENTS

| | | | |
|---|---|---|---|
| 1,344,295 | 6/1920 | Emery et al. | 177—214 X |
| 2,068,565 | 1/1937 | Okey | 177—215 |

RICHARD B. WILKINSON, *Primary Examiner.*